United States Patent [19]
Ramirez et al.

[11] Patent Number: 5,100,540
[45] Date of Patent: Mar. 31, 1992

[54] WATER SAVING SYSTEM

[75] Inventors: Charles D. Ramirez, Redlands; Katherine M. Reid, Long Beach, both of Calif.

[73] Assignee: Lesea Ministries, South Bend, Ind.

[21] Appl. No.: 638,453

[22] Filed: Jan. 4, 1991

[51] Int. Cl.$^5$ .............................................. B01D 35/00
[52] U.S. Cl. ........................................ 210/86; 210/258; 210/295; 210/323.2; 210/416.1; 210/460
[58] Field of Search ................. 210/97, 103, 104, 805, 210/806, 167, 257.1, 257.2, 138, 620, 175, 669, 620, 175, 86, 258, 295; 4/317, 318, 321, 626, 649, 663, 356, DIG. 9, 300

[56] References Cited

U.S. PATENT DOCUMENTS

| | | | |
|---|---|---|---|
| 3,543,294 | 11/1970 | Boester | 210/620 |
| 3,595,393 | 7/1971 | Messa | 210/103 |
| 4,115,879 | 9/1978 | Toms | 210/175 |
| 4,162,218 | 7/1979 | McCormick | 4/663 |
| 4,197,597 | 4/1980 | Toms | 4/300 |
| 4,359,789 | 11/1982 | Roberts | 4/300 |
| 4,828,709 | 5/1989 | Houser et al. | 210/669 |
| 4,950,392 | 8/1990 | Tiegs et al. | 210/167 |
| 4,975,199 | 12/1990 | Woster et al. | 210/638 |

OTHER PUBLICATIONS

Automatic ⅓ HP Upright Sump Pumps, Teel Water Systems Models 3P11,2, from Granger Catalog, p. 1073.
"Act I Tight Head Shipping Container" brochure; Russell-Stanley, Rancho Cucamonga, Calif.; 2 pp.; no date.

Primary Examiner—Robert A. Dawson
Assistant Examiner—Ana Fortuna
Attorney, Agent, or Firm—Sheldon & Mak

[57] ABSTRACT

Disclosed is an apparatus for collecting and reusing substantially all of the gray water from a source such as a household washing machine without modifications to a building or residence, or the washing machine. The apparatus includes a tank for receiving the water; a pump for pumping the water out of the tank; an activator for activating the pump when the water reaches a predetermined first level in the tank; a deactivator for deactivating the pump when the water falls to a predetermined second level in the tank; and a filter that is preferably formed of a complete pair of stretch pantyhose for filtering lint from the water. A ring clamp holds the filter proximate a filter inlet, the filter extending downwardly within the tank from the ring clamp. Disk members are provided within foot portions of the filter for preventing entry of the filter into the pump. Another configuration of the apparatus, suitable for new construction, provides an auxiliary drain for recycling gray water from the washing machine, and other sources feeding an auxiliary drain such as tubs and bathroom sinks.

28 Claims, 2 Drawing Sheets

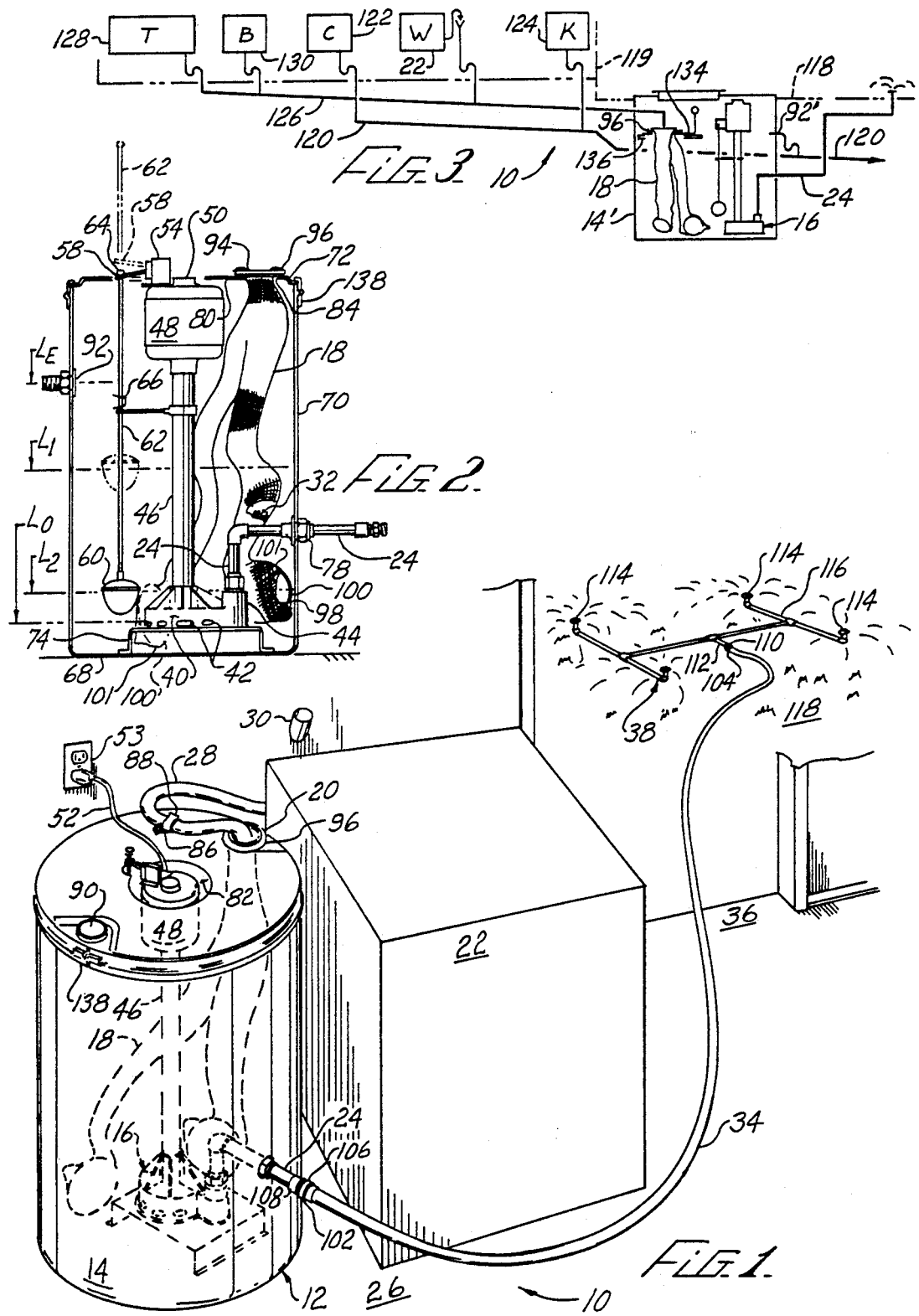

WATER SAVING SYSTEM

BACKGROUND

The present invention relates to a system for saving water, and more particularly to such systems that reuse household gray water, such as from washing machines and the like.

Systems for saving gray water are known. One type of system, as disclosed in U.S. Pat. Nos. 4,197,597 to Toms and 4,162,218 to McCormick, collects gray water from kitchen and bathroom sinks, tubs and showers, and clothes and dishwashers in a holding tank through a filter and gray water drain line that is separate from an existing sewer system. The gray water is then pumped from the holding tank for noncritical water use devices, such as toilet tanks, for reuse and subsequent discarding to the sewer system.

Another such system, disclosed in U.S. Pat. No. 3,543,294 to Boester, includes receptacles and filters buried in the ground into which gray water from kitchen and bathroom sinks, tubs and showers, and clothes and dishwashers is aerated and pumped out of the receptacle for use with toilet bowls and subsequently disposed to a disposal field.

A number of disadvantages are associated with these water saving systems of the prior art, including one or more of the following:

1. They are expensive to install in that existing plumbing must be altered;
2. The are excessively complicated in that fresh water must be introduced when the gray water is exhausted;
3. The gray water is not fully utilized in that the water is drained out to the sewer when the holding tank overflows;
4. They produce foul household odors unless the water is deodorized.

Thus there is a need for an apparatus for reusing household gray water that does not require alteration of existing plumbing, that makes full use of the collected gray water, that does not produce foul odors, and is not harmed by the presence of large quantities of lint in the water.

SUMMARY

The present invention is directed to an apparatus that meets this need by collecting and reusing substantially all of the gray water from a source such as a household washing machine. The apparatus includes a tank for receiving the water; a pump for pumping the water out of the tank; means for activating the pump when the water reaches a predetermined first level in the tank; means for deactivating the pump when the water falls to a predetermined second level in the tank; a flexible porous material forming a tubular member for filtering lint from the water, the tubular member being closed at one end and having a filter inlet at the other end. The apparatus can also include ring clamp means for holding the tubular member proximate the inlet thereof, the tubular member extending downwardly within the tank from the ring clamp means.

Preferably the tubular member has a length of at least approximately 18 inches for permitting the apparatus to be left unattended for extended periods. Preferably the tubular member is formed of a knitted material that can consist of a substantially complete stretch stocking or a substantially complete pantyhose for providing extended filtering capacity at very low cost. The stocking or pantyhose can be a used article that would otherwise have been discarded because of "runs" or the like, yet the filtering process is not substantially harmed. Preferably a fill member is provided within the tubular member for preventing entry of the tubular member into the pump. The fill member can include a disk member having a diameter of at least approximately 4.0 inches. Alternatively, the fill member can include a basket member having a major dimension of at least approximately 4.0 inches.

Preferably the apparatus includes a spreader member extending within the tubular portion of the filter for diffusing the water flowing therein. A spreader conduit can be fluid connected to the spreader member, the spreader conduit protruding the filter inlet for connection to a waste water conduit. The spreader member can be tubular, having an elongate spiral opening formed therein. Preferably the apparatus further includes a cap member for closing an end extremity of the spreader member, the cap member having a plurality of passages extending therethrough for further diffusing the water.

The pump can include a submergible base portion having a pump inlet and a pump outlet, the apparatus further having an outlet conduit extending from the pump outlet. Preferably the outlet conduit sealingly protrudes a side wall of the tank for convenient and efficient connection to a flexible hose such as a garden hose. Preferably the second level is spaced above the inlet, the means for activating and the means for deactivating the pump being manually operable for testing the apparatus. Preferably the apparatus includes a yard sprinkler assembly, and hose means for fluid-connecting the sprinkler assembly to the outlet conduit for full utilization of the gray water. The hose means can include a first base fitting at an outlet extremity of the outlet conduit, and a second hose fitting at an inlet of the sprinkler assembly. The sprinkler assembly can include a plurality of spaced apart, upwardly directed sprinkler units, and a tubular base for placement on a yard surface, the sprinkler units and the second hose fitting being supported rigidly and fluid-connected through the base.

The pump can further include a column portion, and a motor mounted at proximate an upper extremity of the column portion, the second level being below the motor. The tank can have a bottom portion and an upwardly extending side wall, the apparatus further including a lid for the tank, an upper surface of the lid having an elevation proximately in line with an upper extremity of the motor for keeping children from reaching into the motor area, the lid having a motor opening therein for forming an annular motor vent proximate the upper extremity of the motor. The lid can also be formed with an inlet opening for receiving the filter inlet, the lid advantageously supporting the ring clamp means proximate the top of the tank. Preferably the lid is also formed with an auxiliary opening for admitting ventilation air to the motor and for facilitating visual observation of the fluid level in the tank. The tank is preferably formed with an auxiliary outlet for preventing flooding of the motor in case of failure of the means for activating the pump, the auxiliary outlet protruding the side wall of the tank at an elevation below the motor and above the first level.

DRAWINGS

These and other features, aspects, and advantages of the present invention will become better understood with reference to the following description, appended claims, and accompanying drawings, where:

FIG. 1 is an elevational perspective view of a water recycling apparatus according to the present invention;

FIG. 2 is a fragmentary sectional elevational view of a portion of the apparatus of FIG. 1;

FIG. 3 is an elevational diagrammatic view showing an alternative configuration of the apparatus of FIG. 1;

DESCRIPTION

Figure 5:
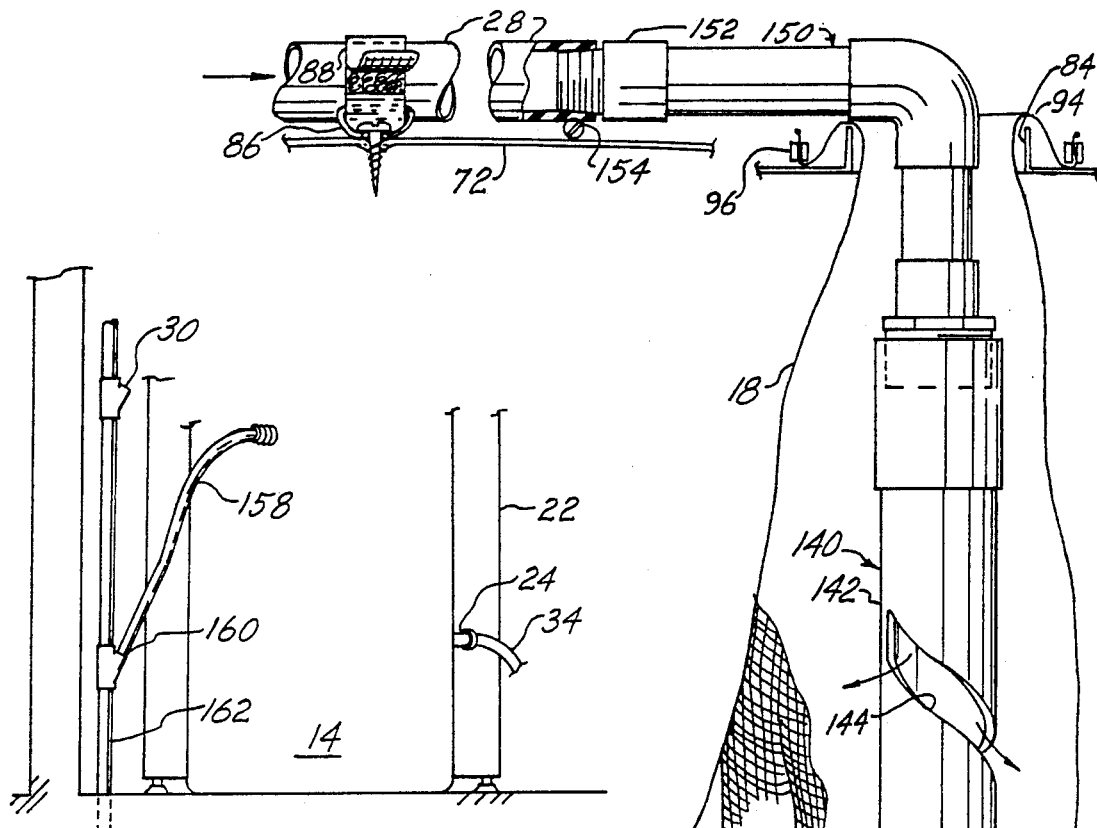
FIG. 5 is a fragmentary elevational view showing an alternative configuration of another portion of the apparatus of FIG. 1.

The present invention is directed to a system for reusing household gray water, especially laundry water, for yard watering and the like. With reference to FIGS. 1 and 2 of the drawings, a water recycling apparatus 10 includes a tank unit 12, the tank unit 12 including a tank 14 having a pump assembly 16 therein, a filter 18 forming a tank inlet 20 for recovering gray water from a conventional washing machine 22. An outlet conduit 24 from the pump assembly 16 extends from the tank unit 12. As shown in FIG. 1, the apparatus 10 is located in a utility area 26 of a garage or residence, a flexible drain conduit 28 of the washing machine 22 being relocated from a conventional drain opening 30. Gray water from the washing machine 22 passes through the drain conduit 28, entering the tank 14 through the filter 18, lint 32 being filtered out by the filter 18. A hose 34 that A hose 34 that is connected to the outlet conduit 24 passes through a utility doorway 36 for connecting the tank unit 12 to a yard sprinkler assembly 38, the gray water being fed from the tank 14 to the sprinkler assembly 38 by the pump assembly 16. When it is desired to close the doorway 36, the hose 34 would be disconnected. Thus no modifications are required to the plumbing of the building, or to the building itself. The filter 18 prevents the sprinkler assembly 38 from being clogged by the lint 32. Typically very large quantities of the lint 32 are produced by in-home laundries.

In a preferred configuration of the present invention, the pump assembly 16 includes a submergible base portion 40 having a pump inlet 42 and a pump outlet 44, the outlet conduit 24 extending from the pump outlet 44. A column portion 46 of the pump assembly 16 supports a motor 48 proximate an upper extremity 50 of the column portion 46, the motor 48 being provided with a power cord 52 for connecting to a standard wall outlet 53. A limit switch 54 activates the motor 48 when the water reaches a predetermined first level $L_1$ in the tank 14, the limit switch 54 deactivating the motor 48 when the water reaches a predetermined second level $L_2$ the second level $L_2$ being below the motor 48. Thus, the pump assembly 16 is initiated when the level of the water reaches $L_1$, the pump assembly 16 being deactivated when the water level falls to $L_2$. For this purpose an adjustable float mechanism 56 slidably engages a lever arm 58 of the limit switch 54. The float mechanism 56 includes a float 60 and a control rod 62, the control rod 62 having an enlargement at its top extremity 64 and a clip 66 that may be adjustably positioned on the rod 62 for controlling the first water level $L_1$. The second water level $L_2$ is controllable by the extent to which the rod 62 is threaded into the float 60. The second water level $L_2$ is located some distance above a base level $L_0$ of the water which is approximately even with the top of the inlet 42 of the pump assembly 16. The spacing of the second level $L_2$ above the inlet 42 permits the lever arm 58 of the limit switch 54 to be manually operable for testing the apparatus 10 when the water level is at or below $L_2$.

The tank 14 includes a bottom portion 68, an upwardly extending side wall 70, and a lid 72. The pump assembly 16 is supported within the tank 14 on a riser or base member 74 for positioning the upper extremity 50 of the motor 48 approximately level with an upper surface 76 of the lid 72. The outlet conduit 24 sealingly protrudes the side wall 70 of the tank 14, a bulkhead fitting 78 sealingly clamping the side wall 70. The lid 72 includes a motor opening 80 therein for forming an annular motor vent 82 proximate the upper extremity 50 of the motor 48. The motor opening 80 is enlarged at one side for clearing the float mechanism 56 and the lever arm 58 of the limit switch 54. The lid 72 also is formed with an inlet opening 84 for receiving the filter 18. The lid 72 includes a screw loop 86 that is bolted through the lid 72, a hook and loop strap 88 being fastened to the screw loop for releasably connecting the drain conduit 28 of the washing machine 22. An auxiliary opening 90 is also formed in the lid 72 for admitting ventilation air to the motor 48 and for facilitating visual observation of the fluid level in the tank 14. An emergency or auxiliary outlet 92 formed in the tank 14 prevents flooding of the motor 48 in case of failure of the limit switch 54, the auxiliary outlet 92 protruding the side wall 70 of the tank 14 at an elevation $L_E$, the elevation $L_E$ being located below the motor 48. As shown in FIG. 2, the auxiliary outlet 92 is configured as a counterpart of the bulkhead fitting 78. Alternatively, the auxiliary outlet 92 can be formed by one or more openings (not shown) in the side wall 70 of the tank 14.

The filter 18 is formed of a flexible tubular porous material that is closed at one end and having a filter inlet 94 at the other end. A ring clamp 96 is connected to the filter inlet 94 for holding the filter 18 proximate the tank inlet 24, the filter 18 extending downwardly within the tank 14 from the ring clamp 96, the ring clamp 96 being supported by the portion of the lid 72 adjacent to the inlet opening 84. The filter 18 is preferably at least approximately 18 inches in length for providing substantial lint capacity. The filter 18 can be formed of a knitted material. Most preferably the filter is formed of a complete pair of stretch pantyhose further described below. Preferably the filter 18 also has a filler element 98 therein proximate the closed end for preventing entry of the filter 18 into the inlet 42 of the pump assembly 16. The filler element 98 can be conveniently provided by a disk-shaped member 100 such as a coffee can lid having a diameter of at least approximately 4.0 inches. When the filter 18 is a pair of pantyhose, there would be two of the disk members 100, one in each foot portion 101 of the pantyhose.

The filter 18 is generously sized for effective containment of the lint 32. More importantly, as the lint 32 builds up in the filter 18, the pantyhose stretches locally. The local stretching phenomena is present when stretch pantyhose is used, stretch panty hose being defined as that in which one size fits a whole range of user sizes. In most cases, runs and other flaws in the pantyhose do not seriously affect the performance of the filter 18. Thus any used or discarded pair of the pantyhose is suitable for use as the filter 18, unless big rips are present.

As discussed above, the sprinkler assembly 38 is fluid-connected to the outlet conduit 24 by the hose 34. The hose 34 can be a conventional garden hose having a threaded inlet coupling 102 and a corresponding threaded hose outlet 104 at opposite ends thereof. A bib fitting 106 is provided at an outlet extremity 108 of the outlet conduit 24 for receiving the inlet coupling 102. Similarly, a second hose coupling 110 is provided at an inlet 112 of the sprinkler assembly 38 for connecting the hose outlet 104 of the hose 34. The sprinkler assembly 38 includes a plurality of spaced apart, upwardly directed sprinkler units 114, and a tubular base 116 for placement on a yard surface 118.

With reference to FIG. 3, an alternative configuration of the apparatus 10 recycles gray water from the washing machine 22 as well as from other portions of the building, designated house 119. This configuration of the apparatus 10, which is most suitable for new construction where separate drain lines can be provided, has counterparts of the tank 14, designated tank 14', the pump assembly 16, the outlet conduit 24, and the filter 18. The house 119 is provided with a main drain 120 for receiving waste water from one or more commodes 122 and a kitchen sink 124, and an auxiliary drain 126 for recovering gray water from a tub 128, bathroom sink 130, and the washing machine 22. The auxiliary drain 126 extends into the tank 14' for feeding the filter 18. The filter 18 hangs from a filter tray 134 which rests on a filter support 136 in the tank 14'. The tank 14' is buried in the yard 118. Alternatively, the tank 14' could be included within the building structure. A counterpart of the auxiliary outlet 92, designated 92' in FIG. 3, is connected to the main drain 120, the auxiliary outlet 92' being located at an elevation at least slightly above the main drain 120 in the vicinity of the tank 14'.

The tank 14 of FIGS. 1 and 2 can be made from a 55 gallon barrel which can be rubber or plastic. The lid 72 is provided with a clamping assembly 138 for clamping the lid 72 to the tank 14. A barrel suitable for use as the tank 14, the lid 72, and the clamping assembly 138 is available as Act I Tight Head Shipping Container from Russell-Stanley of Rancho Cucamonga, CA. The lid 72 is formed from the purchased part by cutting the motor opening 80, the inlet opening 84 and the auxiliary opening 90 being preformed in the lid 72, each of the openings 84 and 90 having a diameter of about 3 inches. A pump suitable as the pump assembly 16 is available from Dayton Electric Manufacturing Co. of Chicago, IL, as Model No. 9K725HP. The outlet 44 of this pump is threaded for connecting a standard 1½ inch pipe fitting. The outlet conduit 24 is formed from standard ¾ inch schedule 40 PVC pipe fittings, a 1½ to ¾ adapter being connected between the outlet 44 and the outlet conduit 24. Conventional PVC adhesive and primer is used for joining and sealing the various fittings and parts of the outlet conduit 24. The ring clamp 96 can be a conventional embroidery hoop. Pantyhose suitable for use as the filter 18 is available as Leggs ® "Sheer Energy" from Leggs Products Incorporated of Winston-Salem, NC, having a panty portion formed of approximately 88% Nylon ® and 12% Spandex ®, and leg portions formed of approximately 81% Nylon ® and 19% Spandex ®.

Figure 4:
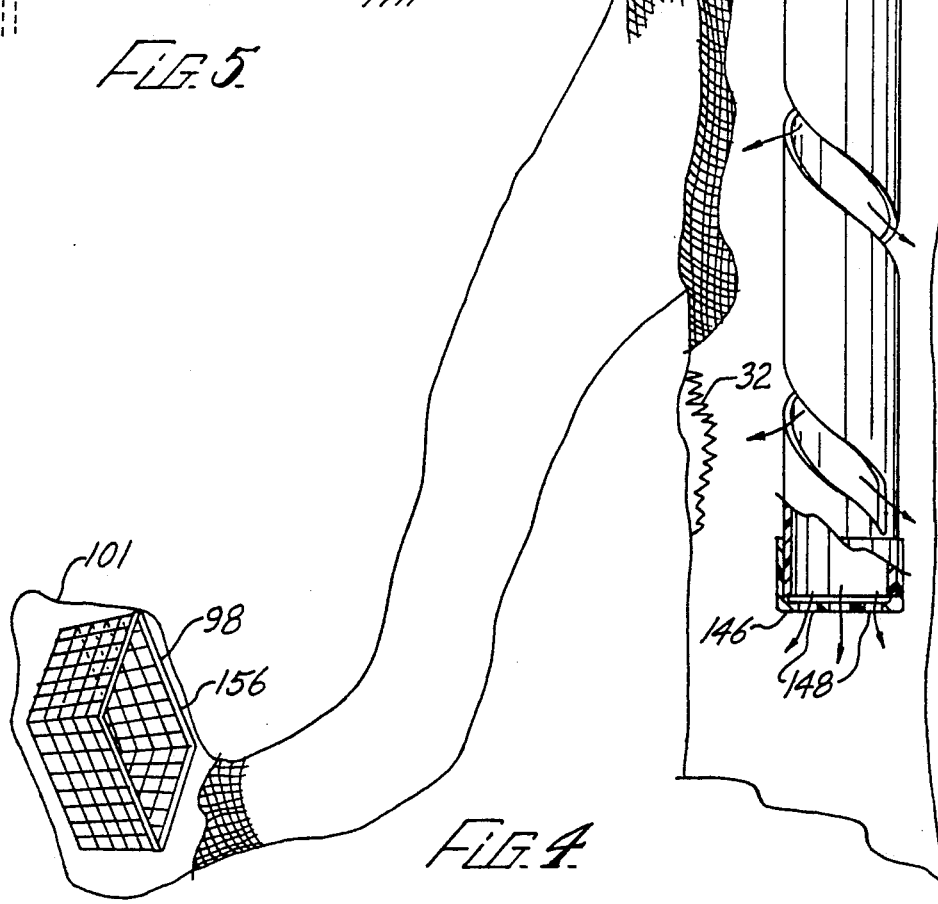
FIG. 4 is a fragmentary sectional elevational view showing an alternative configuration of a portion of the apparatus of FIG. 1.

With further reference to FIG. 4, an alternative configuration of the recycling apparatus 10 has the drain conduit 28 feeding a tubular flow spreader assembly 140 that extends downwardly into one leg portion 141 of the filter 18. The spreader assembly 140 includes a tubular spreader member 142 having a spirally elongate opening 144 therein for diffusing the water by directing the water from the conduit 28 at low velocity and in a plurality of directions within the filter 18, thus advantageously avoiding localized, high velocity contact of the lint 32 against the filter 18. Unexpectedly, it has been discovered that the addition of the spreader assembly 140 markedly increases the useful life of the filter 18 by inducing a gradual and more uniformly distributed build-up of the lint 32 on the inside of the filter 18. Further, the lint 32 forms a more loosely connected mass that is less resistant to fluid flow. Moreover, when the filter 18 is relatively full, a large portion of the lint 32 can easily be removed because the lint 32 is only slightly supportively projecting into the material of the filter 18, thereby further extending the life of the filter 18.

A cap member 146 partially closes a bottom extremity of the spreader member 142, the cap member 146 having a plurality of passages 148 therein for further spreading the water, the flow of water being depicted by the arrows in FIG. 4. The spreader assembly 140 also includes an L-shaped spreader conduit 150 having a threaded inlet coupling 152 for insertion into the drain conduit 28, a ring clamp 154 securing the drain conduit 28 to the threaded portion of the inlet coupling 152. The spreader assembly 140 can be formed by joining PVC pipe and fittings in a conventional manner as described above, with the exception of the opening 144 and the passages 148, which can be formed by conventional drilling. The opening 144 can be formed by milling such as by means of a numerically controlled machine tool, or by molding the spreader member with the opening 144 formed therein.

As further shown in FIG. 4, an alternative configuration of the filler element 98 is provided by a basket member 156 that is inserted into each foot portion 101 of the filter 18. The basket member 156 can be a conventional food basket such as those used for packaging small quantities of strawberries and cherry tomatoes, having a major dimension (such as a diagonal) of at least approximately 4.0 inches. It has been discovered that such commonly available baskets are particularly easy to use and effective in imparting a three-dimensional shape to the foot portions 101. Also, even when the basket member 156 is in a damaged condition such as by breakage of one or more of its members, there is little likelihood of severe damage to the filter 18.

With further reference to FIG. 5, an alternative configuration of the auxiliary outlet 92 has a counterpart of the drain conduit 28 connected thereto, designated auxiliary conduit 158. The auxiliary conduit 158 can be connected to a suitable drain such as a counterpart of the drain opening 30, designated auxiliary drain opening 160 in FIG. 5. The auxiliary drain opening 160 can be provided by a conventional Y-fitting that is connected in series with a drain pipe 162 to which the drain opening 30 is also connected.

Although the present invention has been described in considerable detail with reference to certain preferred versions thereof, other versions are possible. For example, the spreader opening 144 can be provided by counterparts of the passages 148, formed in the spreader member 142. Alternatively, the opening 144 can be replaced by a plurality of axially elongate slots in the spreader member 142. Therefore, the spirit and scope of the appended claims should not necessarily be limited to the description of the preferred versions contained herein.

What is claimed is:

1. An apparatus for reusing household gray water, comprising:
   (a) a tank for receiving the water;
   (b) pump means for pumping the water out of the tank;
   (c) means for activating the pump when the water reaches a predetermined first level in the tank, the second level being lower than the first level;
   (d) means for deactivating the pump when the water reaches a predetermined second level in the tank; and
   (e) means for filtering lint from the water, comprising a flexible porous material forming a tubular member, the tubular member being closed at one end and having a filter inlet at the other end, whereby water entering the tank passes through the filter, thence form the tank through the pump as controlled by the means for activating and the means for deactivating.

2. The apparatus of claim 1, further comprising ring clamp means for holding the tubular member proximate the inlet thereof, the tubular member extending downwardly within the tank from the ring clamp means.

3. The apparatus of claim 2, wherein the tubular member has a length of at least approximately 18 inches.

4. The apparatus of claim 3, wherein the tubular member is formed of a knitted material.

5. The apparatus of claim 4, wherein the tubular member is a substantially complete stretch stocking.

6. The apparatus of claim 4, wherein the tubular member is a substantially complete pantyhose.

7. The apparatus of claim 3, further comprising a fill member within the tubular member for preventing entry of the tubular member into the pump.

8. The apparatus of claim 7, wherein the fill member comprises a disk member having a diameter of at least approximately 4.0 inches.

9. The apparatus of claim 7, wherein the fill member comprises a basket member having a major dimension of at least approximately 4.0 inches.

10. The apparatus of claim 1, further comprising a spreader member extending within the tubular portion of the filter for diffusing the water flowing therein.

11. The apparatus of claim 10, comprising a spreader conduit fluid connected to the spreader member, the spreader conduit protruding the filter inlet for connection to a waste water conduit.

12. The apparatus of claim 10, wherein the spreader member is tubular, having an elongate spiral opening formed therein.

13. The apparatus of claim 12, comprising a cap member for closing an end extremity of the spreader member, the cap member having a plurality of passages extending therethrough for further diffusing the water.

14. The apparatus of claim 1, wherein the pump is supported within the tank, the pump comprising a submergible base portion having a pump inlet and a pump outlet, the apparatus further comprising an output conduit extending from the pump outlet.

15. The apparatus of claim 14, wherein the outlet conduit sealingly protrudes a side wall of the tank.

16. The apparatus of claim 14, further comprising a yard sprinkler assembly, and hose means for fluid-connecting the sprinkler assembly to the outlet conduit.

17. The apparatus of claim 16, wherein the hose means comprises a first base fitting at an outlet extremity of the outlet conduit, and a second hose fitting at an inlet of the sprinkler assembly.

18. The apparatus of claim 17, wherein the sprinkler assembly comprises a plurality of spaced apart, upwardly directed sprinkler units, and a tubular base for placement on a yard surface, the sprinkler units and the second hose fitting being rigidly fluid-connected through the base and supported 19. The apparatus of claim 14, wherein the second level is spaced above the inlet, the means for activating and the means for deactivating the pump being manually operable for testing the apparatus.

20. The apparatus of claim 14, wherein the pump further comprises a column portion, and a motor mounted at proximate an upper extremity of the column portion, the second level being below the motor.

21. The apparatus of claim 20, wherein the tank has a bottom portion and an upwardly extending side wall, the apparatus further comprising a lid for the tank, an upper surface of the lid having an elevation proximately in line with an upper extremity of the motor, the lid having a motor opening therein for forming an annular motor vent proximate the upper extremity of the motor.

22. The apparatus of claim 21, wherein the lid is also formed with an inlet opening for receiving the filter inlet, the lid supporting the ring clamp means.

23. The apparatus of claim 21, wherein the lid is also formed with an auxiliary opening, the auxiliary opening admitting ventilation air to the motor and facilitating visual observation of the fluid level in the tank.

24. The apparatus of claim 20, wherein the tank is formed with an auxiliary outlet for preventing flooding of the motor in case of failure of the means for activating the pump, the auxiliary outlet protruding the side wall of the tank at an elevation below the motor and above the first level.

25. The apparatus of claim 1, wherein the pump means comprises a pump supported within the tank, the means for activating and the means for deactivating being supported by the pump.

26. The apparatus of claim 25, wherein the tubular member extends downwardly from the filter inlet into the tank.

27. The apparatus of claim 3, wherein the porous material comprises an expandable stretch material.

28. An apparatus for reusing household gray water, comprising:
   (a) a tank for receiving the water;
   (b) a pump for pumping the water out of the tank, the pump comprising a submergible base portion supported within the tank and having a pump inlet and a pump outlet;
   (c) an outlet conduit extending from the pump outlet, the outlet conduit sealingly protruding a side wall of the tank;
   (d) means for activating the pump when the water reaches a predetermined first level in the tank, the second level being lower than the first level;
   (e) means for deactivating the pump when the water reaches a predetermined second level in the tank;
   (f) means for filtering lint from the water, comprising a flexible porous material forming a tubular member, the tubular member having a filter inlet at the one end, the tubular member being a substantially complete pantyhose formed of a knitted stretch material and having a pair of closed foot portions;

(g) ring clamp means for holding the tubular member proximate the inlet thereof, the tubular member extending downwardly within the tank from the ring clamp means;

(h) a fill member within each foot portion of the tubular member for preventing entry of the tubular member into the pump, each fill member comprising a disk member having a diameter of at least approximately 4.0 inches; and (i) means for connecting a garden hose to the outlet conduit for watering a yard.

* * * * *